Jan. 5, 1960    R. L. SINK    2,919,578
INTEGRATION SYSTEM
Filed April 16, 1956    2 Sheets-Sheet 1

INVENTOR.
ROBERT L. SINK
BY
Christie, Parker & Hale
ATTORNEYS

Jan. 5, 1960     R. L. SINK     2,919,578
INTEGRATION SYSTEM
Filed April 16, 1956     2 Sheets-Sheet 2

INVENTOR.
ROBERT L. SINK
BY
Christie, Parker & Hale
ATTORNEYS

United States Patent Office 2,919,578
Patented Jan. 5, 1960

2,919,578

INTEGRATION SYSTEM

Robert L. Sink, Altadena, Calif., assignor to Consolidated Electrodynamics Corporation, Pasadena, Calif., a corporation of California Application April 16, 1956, Serial No. 578,322

7 Claims. (Cl. 73—206)

This invention relates to an integration system utilized in a means for obtaining a direct indication of the root of a quantity which varies exponentially as a function of a measurable quantity.

In the measurement of certain physical quantities, such as the measurement of a flow velocity in fluid processing, a need exists for a system capable of integrating or accumulating a total quantity as determined by the measurement of an instantaneous quantity. In the measurement of a fluid rate of flow, the pressure differential across the orifice plate is proportional to the square of the flow. Accordingly, if a transducer is utilized to generate a voltage output which is proportional to the difference in pressure at two points in the fluid conduit system and the transducer output is used to drive a motor having a shaft connected to an indicator, the speed of the motor shaft will be proportional to the difference in pressure at the two points or proportional to the velocity $^2$ of the fluid in the conduit. To obtain a direct indication of the velocity of the fluid, some means must be provided to drive the motor shaft at a speed linearly related to the velocity of the fluid in the conduit.

A continuous closed loop system which may be used to obtain a direct indication of the desired information, regardless of the fact that the quantity varies exponentially, is highly desirable. My new integration system provides a simple and direct means for obtaining a direct indication of the root of a quantity which varies exponentially.

Briefly described, my new system includes an apparatus for integrating the root of an exponential function which is defined by an electrical input signal and includes a motor driven by the electrical input signal having a shaft, the accumulated rotation of which represents the integration of the root of the exponential function defined by the input signal. This is accomplished by feeding back into a differential amplifier a voltage which is related to the speed of the motor shaft. The feedback voltage is such as to control the speed of the motor shaft to obtain a direct indication of the quantity being integrated. Even if the output voltage from the transducer is proportional to the square of a physical quantity or any other exponential function, a feedback system is provided which has a voltage sufficient to maintain the speed of the motor directly related to the actual physical quantity it is desired to measure.

A better understanding of the present invention and its advantages may be had upon a reading of the following detailed description when taken in connection with the drawings, in which.

Figure 1:
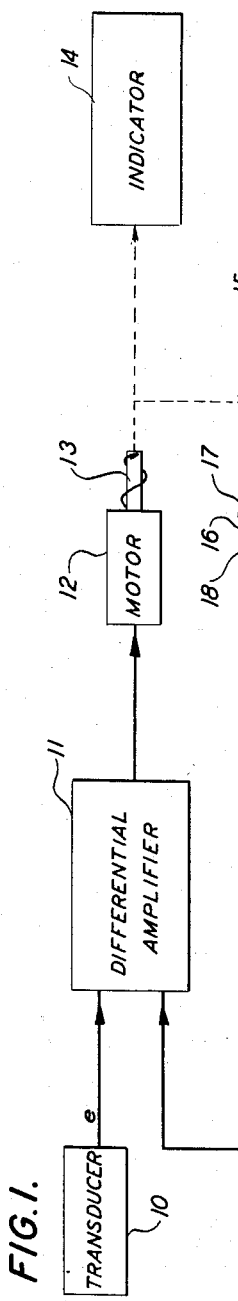
Fig. 1 is a block and schematic diagram showing an integration system which can be utilized for obtaining an indication of a quantity which is linearly related to a measured quantity.

Referring to the drawings in which like parts are referred to by like numerals, Fig. 1 shows a transducer 10, a differential amplifier 11, and a motor 12 having a shaft 13. An indicator 14 is connected to the shaft 13 for giving a direct indication of the integration of the function defined by the signal $e$ produced from the transducer 10. The feedback or integration system is indicated generally by the numeral 15. If the output from the transducer 10 represents a linear function, the feedback system 15 will include therein a single arrangement of an electric charge storage means, such as capacitor $C_1$ and an electric discharge means, such as resistor $R_1$. A switch 16 is connected to a resistor R and is adapted to engage the contacts 17 and 18. Switch 16 is actuated by the motor shaft 13 at least once each revolution of the shaft.

Each time switch 16 touches contact 17, a quantity of charge is transferred to the capacitor $C_1$ from the voltage source E. If, then, the switch 16 is switched from contact 17 to contact 18, the charge in capacitor $C_1$ is completely discharged through the resistor $R_1$. The charge transferred to capacitor $C_1$ at each switch closure is $Q=C_1E$. The total charge transferred is $Q_T=C_1E$ times the total number of switch closures. The current flow, then, is equal to $C_1E$ times the speed of the motor shaft 13. Therefore, the voltage $e_1$ across the resistor $R_1$ is equal to the speed times $R_1C_1E$ or is proportional to the speed of the motor shaft 13.

The peak charging and discharging currents are limited by resistance R in series with the capacitor $C_1$. The smoothing of the voltage feedback is obtained by utilizing at least one smoothing capacitor such as capacitor C in Fig. 1.

The voltage across resistor $R_1$, which is designated by $e_1$, is fed to the differential amplifier 11. The differential amplifier 11 feeds an output voltage to the motor 12, which output voltage is determined by the difference between the feedback signal $e_1$ and the input signal $e$ for controlling the speed of the motor, the speed of the motor being proportional to the input signal.

The indicator 14 may be any type of indicator suitable for indicating a quantity according to the speed of a motor shaft, such as a mechanical accumulator.

Figure 2:
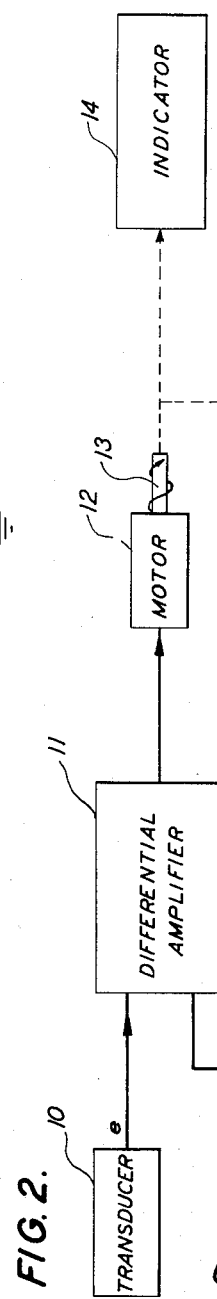
Fig. 2 is a block and schematic diagram showing a system which can be utilized for obtaining a direct indication of the root of a functional quantity, having the exponent 2.

If the exponential function represented by the output $e$ from transducer 10 has the exponent 2, the system shown in Fig. 2 may be utilized to produce an indication of the root of the exponential function. An additional arrangement of electric charge storage means, such as capacitor $C_2$, and electric discharge means, such as resistor $R_2$, is connected in tandem with the electric charge storage capacitor $C_1$ and electric discharge resistor $R_1$. An additional switch 20 is also provided in the system with the switch 20 being adapted to engage contacts 21 and 22. Switch 20 is actuated by motor shaft 13 (as indicated by the dotted lines) at least once during each revolution of the shaft. Switches 20 and 16 are arranged so that capacitor $C_1$ is charged by voltage source E, while the charge in capacitor $C_2$ is discharged through resistance $R_2$. Hence, switch 16 is in contact with contact 17 and switch 20 is in contact with contact 22. The switches are then changed to their other positions to cause the discharge of capacitor $C_1$ into the capacitor $C_2$.

As explained in connection with Fig. 1, the voltage across resistance $R_1$ is $R_1C_1E \times$ speed$=e_1$; the charge transferred to capacitor $C_2$ for each closure of switch 20 equals $C_2e_1$ which is equal to $R_1C_2C_1E \times$ speed. The total charge $Q_T = R_1 C_2 C_1 E \times$ speed $\times$ the number of switch closures. The current through resistor $R_2$ then is equal to $R_1 C_2 C_1 E$ speed². The output signal $e_2$ from the feedback circuit, which is fed to the differential amplifier 11, is therefore proportional to the speed² of the motor shaft 13. Since the output from transducer 10 is representative of a quantity having an exponent 2, the speed of the motor shaft 13 directly represents the root of the quantity.

If the output $e$ from the transducer defines an exponential function having an exponent other than 1 or 2, additional arrangements of electric charge storage means and electric discharge means can be added in tandem to the arrangements of electric charge storage means and discharge means shown in Fig. 2, with the actual number of arrangements of charge storage means and discharge means corresponding to the exponent of the function represented by the output from transducer 10.

Figure 3:
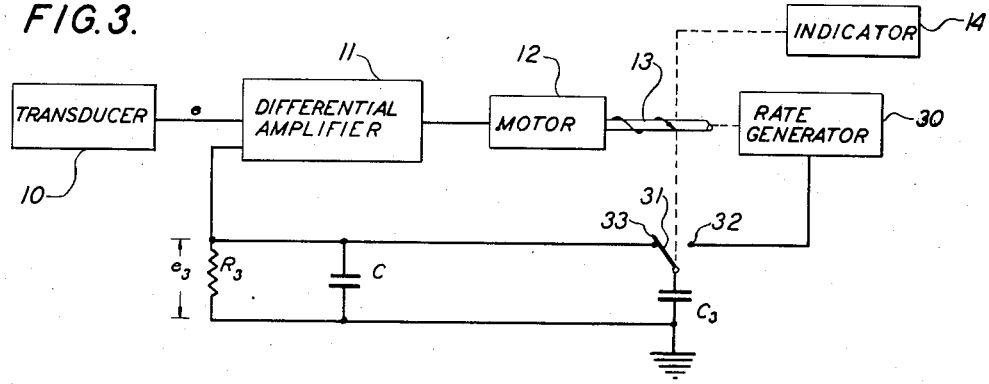
Fig. 3 is a block and schematic diagram showing a second embodiment which can be utilized to measure directly the root of a functional quantity having the exponent 2.

An alternative system for producing a feedback signal for use with a transducer having a signal which represents an exponential function with the exponent 2, is shown in Fig. 3. A rate generator 30 is utilized to produce a voltage which is proportional to the speed of the motor shaft 13. The rate generator 30 therefore performs a function similar to the function performed by the voltage source E, capacitor $C_1$ and resistor $R_1$, and switch 16 described in Figs. 1 and 2. The voltage from rate generator 30 is conducted to a capacitor $C_3$ or other electric charge storage means. A switch 31, actuated by the motor shaft 13 at least once each revolution of the shaft, is utilized to control the charging and discharging of electricity from capacitor $C_3$. Switch 31 is first made to engage contact 32, resulting in the transfer of a certain quantity of charge to capacitor $C_3$ and then made to engage contact 33, resulting in a transfer of the charge from capacitor $C_3$ through the resistance $R_3$, with the output $e_3$ being conducted to the differential amplifier 11. The voltage $e_3$ across the resistor $R_3$ is proportional to the speed of the shaft 13 and the voltage supplied to capacitor $C_3$ from the rate generator 30. The voltage supplied to capacitor $C_3$ is itself proportional to the speed of shaft 13; therefore $e_3$ is proportional to the speed².

Figure 4:
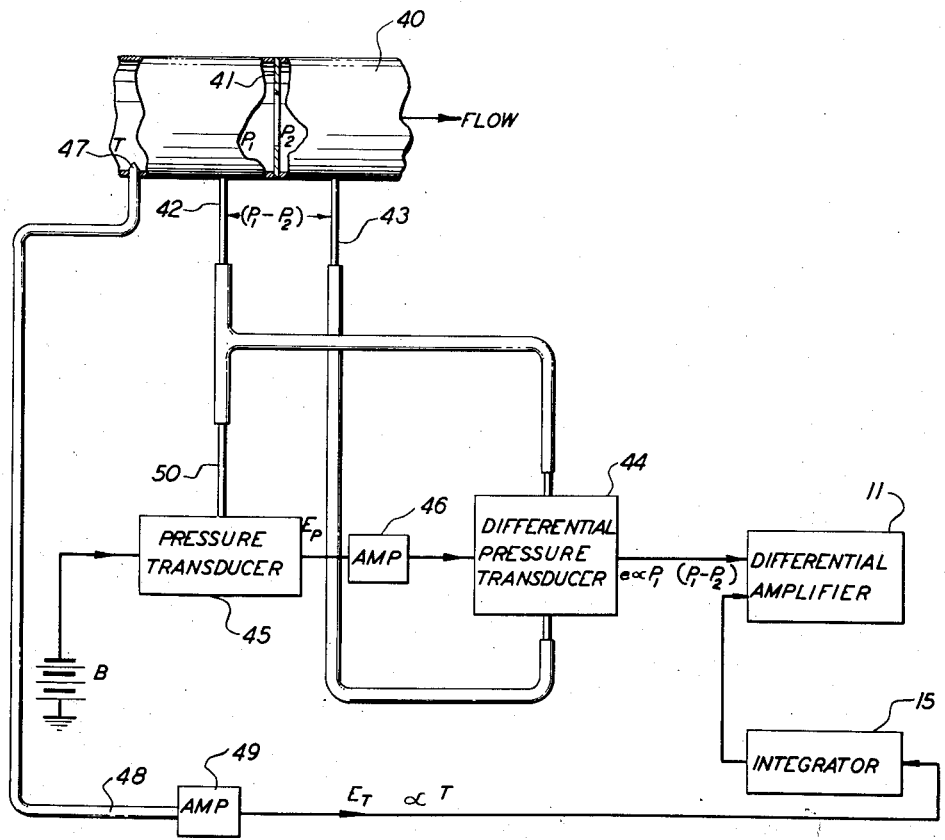
Fig. 4 shows schematically a flow rate measuring system to which my new integration system can be applied.

My new system for integrating the root of an exponential function defined by an electrical input signal has particular utility when used in conjunction with a fluid flow system such as shown in Fig. 4. A fluid flow conduit 40 is shown having an orifice plate 41 through which the fluid flows. Connected to the conduit 40 at a point on one side of orifice plate 41 is a means for transmitting the pressure $P_1$, such as a conduit 42, to a differential pressure transducer 44. A conduit 43 is connected adjacent the other side of orifice plate 41 to transmit the lower pressure $P_2$ to differential pressure transducer 44. Hence, the voltage output $e$ of the differential pressure transducer 44 is proportional to $(P_1 - P_2)$. The difference in pressure in a fluid flow system is proportional to the velocity² of the flow. The output $e$ from differential pressure transducer 44 is conducted to the differential amplifier 11. The integration of the root of the function defined by the signal $e$ is carried out by either the system described in Fig. 2 or the system described in Fig. 3. The motor is then controlled to have a speed which represents directly the velocity of the fluid flowing through conduit 40, with the velocity of the motor being indicated by indicator 14.

If the fluid flowing through fluid conduit 40 is a gaseous fluid, the effects of the pressure of the fluid and the temperature of the fluid can be compensated for by utilizing my new system. To compensate for the effects of pressure, pressure transducer 45 having a pressure transmitting conduit 50 connected thereto, is arranged in the system to produce an output $E_p$ which is proportional to the pressure $P_1$. The excitation voltage for pressure transducer 45 is supplied from a battery B. The output from pressure transducer 45 is amplified by amplifier 46 and fed to the differential pressure transducer 44, the output from the differential pressure transducer being proportional to $P_1 (P_1 - P_2)$. The actual speed of the motor shaft is therefore altered slightly to compensate for the pressure $P_1$.

Compensation for the effects of temperature is provided by means of a thermocouple 47 which is disposed within the fluid flow conduit 40 and conducts an electrical current through conductors 48, which electrical current is proportional to the temperature T. The current is amplified by amplifier 49 and fed into one of the components in the integrator 15 to compensate for the effects of temperature. For example, the voltage $E_T$ may be fed to the voltage source E in Fig. 2 or to the conductor leading from rate generator 30 to contact 32 in Fig. 3, to vary the voltage applied to the capacitors $C_1$ or $C_3$, respectively. Alternatively, the voltage $E_T$ might be fed to one of the resistors included in the circuit shown in Fig. 2 or Fig. 3 to vary the resistance component of the integrator 15 according to the temperature T.

I claim:

1. In apparatus for integrating the root of an exponential function defined by an electrical input signal, and including a motor having a shaft whose cumulative rotation represents the integration of the function defined by the input signal, the improvement which comprises a feedback circuit having at least two arrangements each including a capacitor means and a resistor means connected, a switch connected to each arrangement and actuated by the motor shaft at least once each shaft revolution, a voltage source connected to one of said arrangements with the switch of said one arrangement serving to cause the charging of the capacitor means by the voltage source and then the discharging of said capacitor means through the resistor means, the resistor means being connected in series with an adjoining arrangement of a capacitor means and a resistor means, with the switch of said adjoining arrangement serving to cause the charging of the capacitor means in said adjoining arrangement by the capacitor means in said one arrangement and then the discharge of the capacitor means in the adjoining arrangement through the resistor means in said adjoining arrangement, and means for receiving the feedback signal and the input signal and producing an output signal determined by the difference between the feedback signal and the input signal for controlling the speed of the motor.

2. In combination, a fluid flow conduit, means for transmitting the pressure from two points in said fluid conduit having different pressures to a differential pressure transducer which produces an electrical output proportional to the pressure difference at said two points, means for conducting the electrical output from the differential pressure transducer to a differential amplifier and then to a motor having a rotatable shaft, means controlled by the rotatable shaft for producing a voltage proportional to the speed of the shaft, an arrangement of electric charge storage means and discharge means serially connected to the means for producing a voltage proportional to the speed of the shaft, switching means actuated by the shaft at least once each revolution to cause first the charging of the charge storage means and then the discharging of the charge storage means through the discharge means, the output from the discharge means being proportional to the square of the speed of the shaft, means for conducting the output from the discharge means to the differential amplifier, the output from the differential amplifier thereby serving to control the speed of the shaft so as to be proportional to the rate of flow of the fluid in the fluid flow conduit, and an indicator connected to the shaft.

3. The combination of claim 2 wherein the means controlled by the rotatable shaft for producing a voltage proportional to the speed of the shaft includes a voltage source, a series arrangement of an electric charge storage means and electric charge discharge means, and a switching means actuated by the motor shaft at least once each revolution to first charge the electric charge storage means and then discharge the electric charge through the electric charge discharge means.

4. The combination of claim 2 wherein the means controlled by the rotatable shaft for producing a voltage proportional to the speed of the shaft includes a rate generator.

5. The combination of claim 2 wherein the electric charge storage means and the electric charge discharge means include capacitor means and resistor means, respectively.

6. In combination, a fluid flow conduit, means for transmitting the pressure from two points in said fluid conduit having different pressures to a differential pressure transducer, means for transmitting the higher pressure to a pressure transducer for producing an electrical output proportional to the higher pressure, means for conducting said output to the differential pressure transducer the output from the differential pressure transducer being thereby proportional to the higher pressure times the difference in pressure between the two points in the fluid conduit, means for conducting the electrical output from the differential pressure transducer to a differential amplifier and then to a motor having a rotatable shaft, means controlled by the rotatable shaft for producing a voltage substantially proportional to the square of the speed of the shaft and feeding the said voltage to the differential amplifier, means including a thermocouple disposed in the fluid conduit and electrically connected to said voltage producing means for feeding a voltage to the voltage producing means which is proportional to the temperature of the fluid in the fluid conduit, the output from the differential amplifier thereby serving to control the speed of the shaft so as to be proportional to the rate of flow of the fluid in the fluid flow conduit with corrections for pressure and temperature, and an indicator connected to the shaft.

7. In apparatus for integrating the root of an exponential function defined by an electrical input signal, and including a motor having a shaft whose cumulative rotation represents the integration of the root of the function defined by the input signal, the improvement which comprises a feedback circuit having at least two arrangements connected in tandem for storing an electric charge and means for discharging the stored charge, the number of arrangements of electric charge storing means and discharging means corresponding to the exponent of the exponential function, a switch connected to each arrangement and actuated by the motor shaft at least once each shaft revolution serving to charge the means for storing an electric charge and then to discharge the stored charge through the discharging means, all of the means for discharging the stored charge in each arrangement except one being connected to charge the means for storing an electric charge located in the adjoining arrangement and with the means for discharging the stored charge in said one arrangement producing a feedback signal, and means for receiving the feedback signal and the input signal and producing an output signal determined by the difference between the feedback signal and the input signal for controlling the speed of the motor.

References Cited in the file of this patent

UNITED STATES PATENTS

| | | |
|---|---|---|
| 1,904,438 | Freeman | Apr. 18, 1933 |
| 2,098,574 | Doyle | Nov. 9, 1937 |
| 2,455,247 | Griest | Nov. 30, 1948 |
| 2,513,537 | Williams | July 4, 1950 |
| 2,551,964 | Norton | May 8, 1951 |
| 2,555,491 | Hooven | June 5, 1951 |
| 2,671,610 | Sweer | Mar. 9, 1954 |
| 2,820,939 | Elwell | Jan. 21, 1958 |